United States Patent
Zhou (10) Patent No.: US 11,700,085 B2
(45) Date of Patent: Jul. 11, 2023

(54) METHOD AND APPARATUS FOR TRANSMITTING RESPONSE INFORMATION ON FEEDBACK RESOURCES

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 374 days.

(21) Appl. No.: 17/265,706

(22) PCT Filed: Aug. 10, 2018

(86) PCT No.: PCT/CN2018/100038
§ 371 (c)(1),
(2) Date: Feb. 3, 2021

(87) PCT Pub. No.: WO2020/029269
PCT Pub. Date: Feb. 13, 2020

(65) Prior Publication Data
US 2021/0320756 A1 Oct. 14, 2021

(51) Int. Cl.
*H04L 1/08* (2006.01)
*H04W 72/04* (2023.01)

(52) U.S. Cl.
CPC .............. *H04L 1/08* (2013.01); *H04W 72/04* (2013.01)

(58) Field of Classification Search
CPC ... H04L 1/0026; H04L 5/0044; H04L 1/0063; H04L 1/1819; H04L 25/0226;
(Continued)

(56) References Cited

U.S. PATENT DOCUMENTS

2014/0355472 A1 12/2014 Hasegawa et al.
2015/0023313 A1 1/2015 Thubert et al.
(Continued)

FOREIGN PATENT DOCUMENTS

CN 107889232 A 4/2018
EP 3280215 A1 * 2/2018 ........... H04B 7/0814
(Continued)

OTHER PUBLICATIONS

Examination Report for Indian Application No. 202147009578, dated Feb. 2, 2022.
(Continued)

*Primary Examiner* — Rushil P. Sampat
(74) *Attorney, Agent, or Firm* — Finnegan, Henderson, Farabow, Garrett & Dunner, L.L.P.

(57) ABSTRACT

Provided are a method and apparatus for transmitting information, and a storage medium and a terminal. The method includes: determining, on an uplink feedback resource unit within a first downlink resource range currently occupied during downlink transmission, whether first response information corresponding to the first downlink resource range is successfully transmitted to a base station, wherein the uplink feedback resource unit includes a resource unit for transmitting the first response information to the base station; when the first response information is transmitted unsuccessfully, determining a target feedback resource unit within at least one second downlink resource range subsequently occupied during the downlink transmission; and retransmitting, on the target feedback resource unit, the first response information to the base station.

16 Claims, 7 Drawing Sheets

(58) Field of Classification Search
CPC . H04L 27/2607; H04L 5/0048; H04L 5/0055; H04L 27/2602; H04L 1/08; H04W 56/00; H04W 56/001; H04W 72/042; H04W 72/0473; H04W 72/23; H04W 72/04
See application file for complete search history.

(56) References Cited

U.S. PATENT DOCUMENTS

| | | | |
|---|---|---|---|
| 2018/0279277 A1* | 9/2018 | Park | H04L 1/1854 |
| 2018/0368163 A1* | 12/2018 | Feng | H04W 24/02 |
| 2019/0173612 A1* | 6/2019 | Kimura | H04L 1/0063 |
| 2020/0036489 A1* | 1/2020 | Wang | H04L 1/16 |

FOREIGN PATENT DOCUMENTS

| | | |
|---|---|---|
| EP | 3280215 A1 | 2/2018 |
| WO | WO 2014000689 A1 | 1/2014 |
| WO | WO 2017133364 A1 | 8/2017 |
| WO | WO 2017/161573 A1 * | 9/2017 |
| WO | WO 2018/030185 A1 * | 2/2018 |

OTHER PUBLICATIONS

Extended European Search for European Application No. 18929322.8, dated Feb. 25, 2022.
Written Opinion of the International Searching Authority in Application No. PCT/CN2018/100038, dated Apr. 30, 2019, 12 pages.

* cited by examiner

METHOD AND APPARATUS FOR TRANSMITTING RESPONSE INFORMATION ON FEEDBACK RESOURCES

CROSS REFERENCE TO RELATED APPLICATIONS

This application is a national phase application based on International Application No. PCT/CN2018/100038, filed Aug. 10, 2018, the content of which is incorporated herein by reference.

TECHNICAL FIELD

The disclosure relates to the communication field, and more particularly, to a method for transmitting information, an apparatus for transmitting information, a storage medium, and a terminal.

BACKGROUND

The NR (New Radio Access Technology) is an important 5G (5th-Generation mobile networks or 5th-Generation wireless systems) application. When the 5G NR transmission is applied to unlicensed frequency bands, it needs the base station to overcome the interference caused by transmissions of other base stations because the unlicensed frequency bands are not controlled by the network deployed by the communication operator. The existing way of avoiding the interference is an LBT (License Before Talk) mechanism, where the unlicensed frequency bands are divided into different channels, and when the base station uses a certain channel for transmissions, it first monitors whether there are other transmissions on the certain channel and initiates its own transmissions if there are no other transmissions on the certain channel.

When the base station is performing a downlink transmission, it generally has an opportunity for an uplink transmission on the last resource unit within the occupied downlink resource range. The terminal may feed response information for the downlink transmission on this resource unit, such as acknowledgement (ACK) information or non-acknowledgement (NACK) information. However, under the LBT mechanism, if the last resource unit is occupied (for example, other systems may transmit data on this resource unit), the base station may not perform the uplink transmissions on the last resource unit, thus missing the opportunity for the uplink transmission and resulting in the inability to transmit the response information.

SUMMARY

According to a first aspect for embodiments of the disclosure, a method for transmitting information is provided. The method is applicable to a terminal and includes: determining whether first response information corresponding to a first downlink resource range is successfully transmitted to a base station on an uplink feedback resource unit within the first downlink resource range, the first downlink resource range being currently occupied by a downlink transmission; the uplink feedback resource unit including a resource unit for transmitting the first response information to the base station; determining a target feedback resource unit within at least one second downlink resource range subsequently occupied by the downlink transmission when the first response information fails to be transmitted; and retransmitting the first response information to the base station on the target feedback resource unit.

According to a second aspect for embodiments of the disclosure, an apparatus for transmitting information is provided. The apparatus is applicable to a terminal and includes: a judging module, configured to determine whether first response information corresponding to a first downlink resource range is successfully transmitted to a base station on an uplink feedback resource unit within the first downlink resource range, the first downlink resource range being currently occupied by a downlink transmission; the uplink feedback resource unit comprising a resource unit for transmitting the first response information to the base station; a determining module, configured to determine a target feedback resource unit within at least one second downlink resource range subsequently occupied by the downlink transmission when the first response information fails to be transmitted; and a transmitting module, configured to retransmit the first response information to the base station on the target feedback resource unit.

According to a third aspect for embodiments of the disclosure, a computer-readable storage medium having one or more computer programs stored thereon is provided. The one or more computer programs are configured to implement the method according to the first aspect as described above.

According to a fourth aspect for embodiments of the disclosure, a terminal is provided and includes a memory having computer programs stored thereon; and a processor configured to execute the computer programs on the memory for implementing the method according to the first aspect as described above.

With the above technical solutions, the target resource unit for retransmitting the response information may be determined when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

DETAILED DESCRIPTION

The specific embodiments of the disclosure will be described in detail below in combination with the accompanying drawings. It should be understood that the specific embodiments described herein are only used to illustrate and explain the disclosure, without limitations to the disclosure.

First of all, scenarios for the disclosure are explained. The rapid growth of mobile broadband services has led to an increasingly strong demand for spectrums in the cellular networks of operators. At present, the spectrum in the cellular network is used in a main form of a dedicated spectrum, i.e., which is unique to a certain network. Although the exclusively used dedicated spectrum is more efficient, it is expensive and the total amount of spectrums is limited. On the other hand, unlicensed spectrums have attracted increasing attention from operators due to their abundant usable bandwidths and low license fees. In some areas, technical applications on the unlicensed spectrums need to follow certain regulations, so that they may coexist fairly on the unlicensed spectrums with other technologies such as Wi-Fi (Wireless Fidelity), or different operators' networks, or different cellular communication standards. Therefore, for the NR system, it is not only necessary to satisfy the regulatory requirements, but also to ensure that it does not cause obvious impact on the existing systems, so that it may coexist fairly with other technologies on the unlicensed spectrums and avoid channel conflicts while satisfying the regulatory requirements. An existing method for ensuring fair coexistence is called a LBT (Listen Before Talk). This method is mainly to perform an idle channel assessment check before using one channel, to determine whether the channel is idle, and to perform a downlink transmission only when the channel is idle.

When the base station is performing a downlink transmission (that is, a process in which the base station transmits downlink data to a terminal), it generally has an opportunity for an uplink transmission on the last resource unit within the downlink resource range. The terminal may feed response information for the downlink transmission back to the base station on this resource unit, such as acknowledgement (ACK) information or non-acknowledgement (NACK) information. The base station may determine whether the terminal has received the correct downlink data according to the ACK/NACK information. If the response information is the ACK information, it may be determined that the terminal has received the correct downlink data. If the response information is the NACK information, it is determined that the terminal has received the wrong downlink data. At this time, the base station needs to retransmit the downlink data corresponding to the downlink resource range.

The downlink resource range may be a sub frame or a time slot. The resource unit may be a time slot or a symbol. The symbol may be an OFDM (Orthogonal Frequency Division Multiplexing) symbol. Of course, this is just an example and there are no limitations in the disclosure. As an example, the downlink resource range includes 14 symbols. The 14 symbols are sequentially denoted as symbol 0, symbol 1, . . . , symbol 12, and symbol 13, where the symbol 0 is configured to transmit downlink control information, the symbols 1-11 are configured to transmit downlink transmission data, the symbol 12 is a blank symbol, and the symbol 13 is the last resource unit in the downlink resource range which may be a preset uplink feedback resource unit. That is, the response information (ACK/NACK information) of the downlink resource range is fed on this last resource unit.

When the base station and the terminal perform the LBT detection, the uplink transmission is blocked if the symbol 13 is occupied (for example, other systems may transmit data on this resource unit), and the terminal may not feed the response information back to the base station on the symbol 13, thus missing the opportunity of performing uplink transmissions and resulting in the inability to transmit the response information.

The disclosure provides a method for transmitting information, an apparatus for transmitting information, a storage medium, and a terminal. The method may determine the target resource unit for retransmitting the response information when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

The disclosure will be described below in conjunction with specific embodiments.

Figure 1:
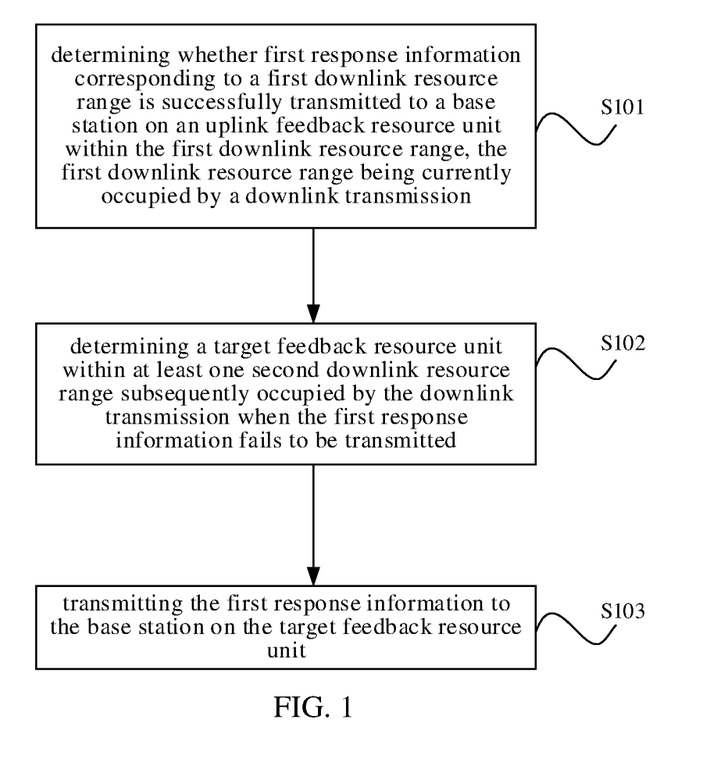
FIG. 1 is a flowchart of a method for transmitting information according to embodiments of the disclosure.

FIG. 1 is a flowchart of a method for transmitting information according to embodiments of the disclosure. As illustrated in FIG. 1, the method may be applicable to a terminal and include the following.

S101, it is determined whether first response information corresponding to a first downlink resource range is successfully transmitted to a base station on an uplink feedback resource unit within the first downlink resource range. The first downlink resource range is currently occupied by a downlink transmission.

The uplink feedback resource unit includes a resource unit for transmitting the first response information to the base station. The first response information may be ACK/NACK information. The ACK information means that downlink data is received correctly, and the NACK information means that the downlink data is received incorrectly. The base station needs to retransmit the downlink data within the downlink resource range corresponding to the NACK information when receiving the NACK information. The ACK/NACK information may be identified by an identification bit. For example, the ACK information may be represented by 1 and the NACK information may be represented by 0.

Generally, the last resource unit in the first downlink resource range may be served as the uplink feedback resource unit. In this action, whether the first response information corresponding to the first downlink resource range is successfully transmitted to the base station may be determined by the two aspects, i.e., determining whether the terminal transmits the first response information when the first response information should be transmitted, and determining whether the terminal receives a response confirmation message transmitted from the base station when transmitting the first response information.

In a possible implementation, it may be determined whether the first response information is transmitted to the base station on the uplink feedback resource unit; if it is determined that the first response information is not transmitted to the base station, it is determined that the first response information fails to be transmitted. That is, when the first response information corresponding to the first downlink resource range should be transmitted while the terminal does not transmit the first response information, it is determined that the first response information fails to be transmitted.

For example, after the terminal performs the LBT detection in the first downlink resource range, the terminal does not transmit the first response information to the base station on the uplink feedback resource unit if the uplink feedback resource unit is occupied. The terminal transmits the first response information to the base station on the uplink feedback resource unit if the uplink feedback resource unit is not occupied.

It is determined whether a response confirmation message transmitted from the base station is received within a first preset duration after transmitting the first response information to the base station; it is determined that the first response information is transmitted successfully if the first preset duration is reached and the response confirmation message transmitted from the base station is received; it is determined that the first response information fails to be transmitted if the first preset duration is reached and the response confirmation message transmitted from the base station is not received.

It should be noted that the above response confirmation message may be a confirmation message broadcast by the base station through a broadcast signaling, or may be a confirmation message transmitted by the base station through a radio resource control (RRC) message; the above response confirmation message may also be a confirmation message transmitted by the base station through a media access control (MAC) control element (CE) signaling, or may be a confirmation message transmitted by the base station through a physical layer signaling, which is not limited in the disclosure.

S102, a target feedback resource unit within at least one second downlink resource range subsequently occupied by the downlink transmission, is determined when the first response information fails to be transmitted.

In this action, the target feedback resource unit may be determined in any of the following two manners.

Manner 1: a preset feedback resource unit within each of the at least one second downlink resource range may be determined as the target feedback resource unit.

Exemplarily, the last symbol in each second downlink resource range may be served as the preset feedback resource unit, which in turn is determined to be the target feedback resource unit. Subsequently, the terminal transmits the first response information on the last symbol within each second downlink resource range.

Manner 2: a number of times that the first response information consecutively fails to be transmitted may be determined, and the target feedback resource unit may be determined within the at least one second downlink resource range through a back-off algorithm based on the number of times.

In a possible implementation, the number of back-off resources may be determined through the back-off formula based on the number of times, a target unit location may be determined based on the number of back-off resources, and a resource unit at the target unit location may be determined as the target feedback resource unit.

The back-off formula includes $M=N*2^{n-1}$ or $M=N*2n$, in which M is the number of back-off resources, N is a number of resource units included in the second downlink resource range, and n is the number of times.

As an example, the first downlink resource range and the second downlink resource range each includes 14 symbols, which are denoted as symbol $0, \ldots,$ symbol 13. The symbol 13 in the first downlink resource range is the uplink feedback resource unit. If the response information is not successfully transmitted to the base station for a first time on this symbol 13, it may be obtained by the formula $M=N*2^{n-1}$ that the number of back-off resources is 14. In this way, the terminal may determine a resource unit waiting behind the 14 resource units as the target feedback resource unit. If the response information is not successfully transmitted to the base station for a second time on this symbol 13, it may be obtained by the formula $M=N*2^{n-1}$ that the number of back-off resources is 28. In this way, the terminal may determine a resource unit waiting behind the 28 resource units as the target feedback resource unit.

Of course, it is explained above as an example that the formula $M=N*2^{n-1}$ is taken for calculating the number of back-off resources. The formula for calculating the number of back-off resources in the disclosure is not limited herein. For example, the disclosure may also take the formula $M=N*2n$ for calculating the number of back-off resources.

S103, the first response information is retransmitted to the base station on the target feedback resource unit.

In this action, when transmitting the first response information to the base station, a new target feedback resource unit may be determined through the above action of S102 if the first response information fails to be retransmitted to the base station, and the first response information is retransmitted to the base station on the new target feedback resource unit until the transmission is successful. If the first response information is successfully transmitted to the base station, the base station may determine whether downlink data received by the terminal is correct based on the first response information. It is determined that the transmission for the downlink data is completed when the downlink data received by the terminal is correct, and the downlink data may be retransmitted when the received downlink data is incorrect.

Herein, considering a case that the terminal fails continuously to transmit the first response information to the base station, more system resources will be occupied since the terminal tries to transmit the first response information for multiple times. In order to solve this problem, in some embodiments of the disclosure, it is also possible to determine whether a preset discarding condition is satisfied when the first response information fails to be retransmitted to the base station, and the first response information is discarded when the preset discarding condition is satisfied. If the preset discarding condition is not satisfied, it returns to the above action of S102 to retransmit the first response information to the base station until the transmission is successful.

Exemplarily, the preset discarding condition may be reaching a second preset duration. That is, when the first response information fails to be retransmitted to the base station, the first response information is discarded if the first response information is still not successfully transmitted to the base station after the second preset duration is reached. The preset discarding condition may also be passing through a preset number of second downlink resource ranges (such as sub-frames or time slots, etc.). That is, when the first response information fails to be retransmitted to the base station, the first response information is discarded if the first response information is still not successfully transmitted to the base station after passing through the preset number of second downlink resource ranges (such as sub-frames or time slots, etc.).

With the above method, the target resource unit for retransmitting the response information may be determined when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

Figure 2:
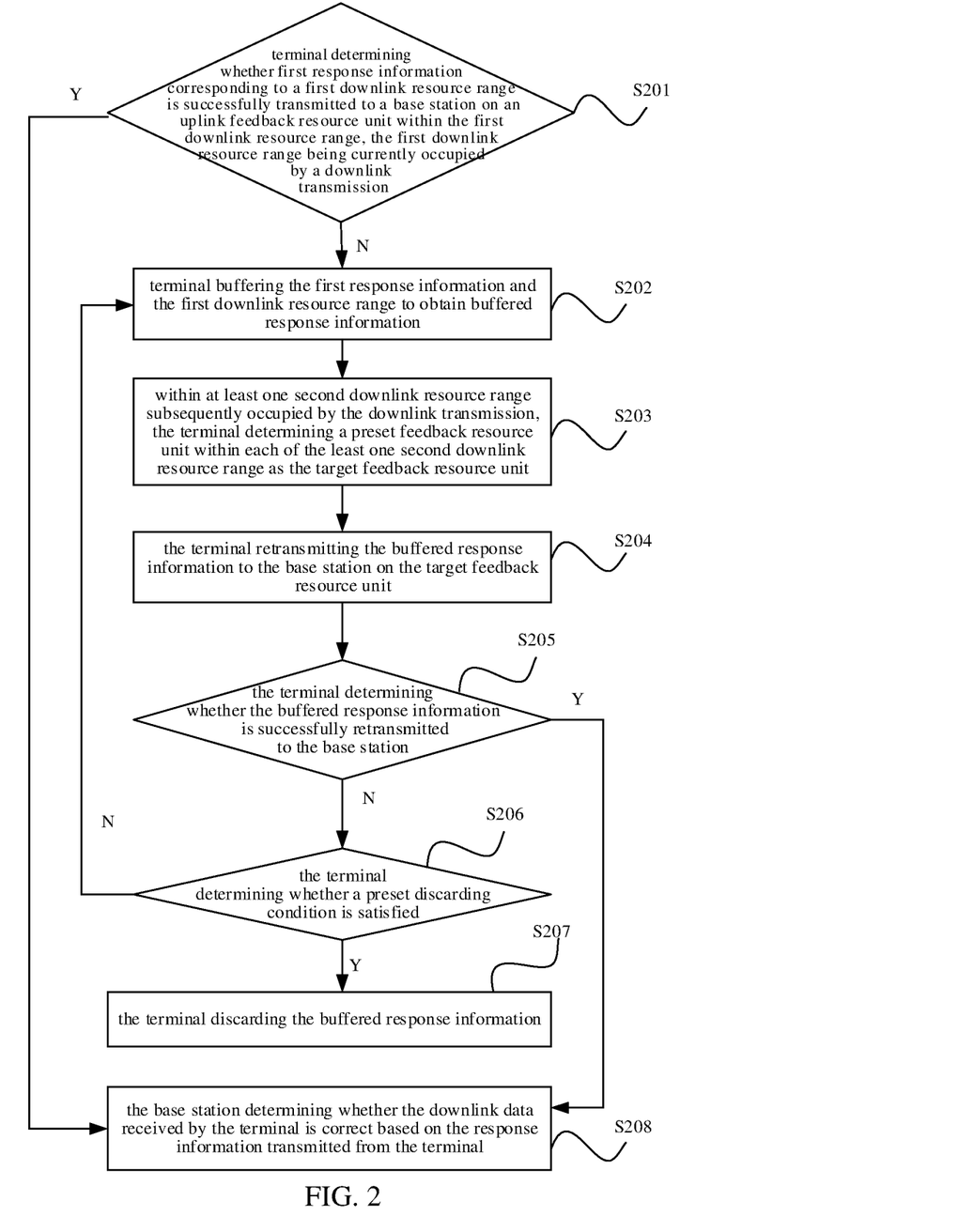
FIG. 2 is a flowchart of another method for transmitting information according to embodiments of the disclosure.

FIG. 2 is a flowchart of another method for transmitting information according to embodiments of the disclosure. As illustrated in FIG. 2, the method includes the following.

S201, the terminal determines whether first response information corresponding to a first downlink resource range is successfully transmitted to a base station on an uplink feedback resource unit within the first downlink resource range. The first downlink resource range is currently occupied by a downlink transmission.

The uplink feedback resource unit includes a resource unit for transmitting the first response information to the base station. The first response information may be ACK/NACK information. The ACK information means that downlink data is received correctly, and the NACK information means that the downlink data is received incorrectly. The base station needs to retransmit the downlink data within the downlink resource range corresponding to the NACK information when receiving the NACK information. The ACK/NACK information may be identified by an identification bit. For example, the ACK information may be represented by 1 and the NACK information may be represented by 0.

Generally, the last resource unit in the first downlink resource range may be served as the uplink feedback resource unit. In this action, whether the first response information corresponding to the first downlink resource range is successfully transmitted to the base station may be determined by the two aspects, i.e., determining whether the terminal transmits the first response information when the first response information should be transmitted, and determining whether the terminal receives a response confirmation message transmitted from the base station when transmitting the first response information.

In a possible implementation, it may be determined whether the first response information is transmitted to the base station on the uplink feedback resource unit; if it is determined that the first response information is not transmitted to the base station, it is determined that the first response information fails to be transmitted. That is, when the first response information corresponding to the first downlink resource range should be transmitted while the terminal does not transmit the first response information, it is determined that the first response information fails to be transmitted.

For example, after the terminal performs the LBT detection in the first downlink resource range, the terminal does not transmit the first response information to the base station on the uplink feedback resource unit if the uplink feedback resource unit is occupied. The terminal transmits the first response information to the base station on the uplink feedback resource unit if the uplink feedback resource unit is not occupied.

It is determined whether a response confirmation message transmitted from the base station is received within a first preset duration after transmitting the first response information to the base station; it is determined that the first response information is transmitted successfully if the first preset duration is reached and the response confirmation message transmitted from the base station is received; it is determined that the first response information fails to be transmitted if the first preset duration is reached and the response confirmation message transmitted from the base station is not received.

It should be noted that the above response confirmation message may be a confirmation message broadcast by the base station through a broadcast signaling, or may be a confirmation message transmitted by the base station through a RRC message; the above response confirmation message may also be a confirmation message transmitted by the base station through a MAC CE signaling, or may be a confirmation message transmitted by the base station through a physical layer signaling, which is not limited in the disclosure.

If it is determined that the first response information is successfully transmitted, the action of S208 is executed.

If it is determined that the first response information fails to be transmitted, the action of S202 to the action of S205 are executed.

S202, the terminal buffers the first response information and the first downlink resource range to obtain buffered response information.

The first response information and a range identifier of the first downlink resource range may be buffered.

Considering that there may be a plurality of pieces of buffered response information in the buffer memory space, the plurality of pieces of buffered information will occupy more storage space of the terminal and affect the efficiency of processing data by the terminal. In order to solve this problem, in some embodiments of the disclosure, when there are second response information and a corresponding second downlink resource range that have been buffered, the buffering action may be performed in any of the following two manners.

Manner 1: the first response information and the first downlink resource range are buffered, and the first response information and the second response information are compressed to obtain the buffered response information.

Manner 2: the first response information and the second response information are compressed to obtain the buffered response information, and the buffered response information is buffered.

A third downlink resource range corresponding to the buffered response information includes the first downlink resource range and the second downlink resource range.

It should be noted that the difference between the first and second manner lies in, the first manner is to buffer first, and to compress, while the second manner is to compress first, and to buffer.

In a possible implementation, the above compression may be performing an and-or operation on the first response information and the second response information to obtain the buffered response information.

As an example for illustration, the first response information and the second response information may be the ACK/NACK information, in which the ACK information may be represented by 1 and the NACK information may be represented by 0. If a value for the first response information is 0 and a value for the second response information is 1, a value for the buffered response information is 0 after performing the and-or operation (equivalent to the multiplication operation). If a value for the first response information is 0 and a value for the second response information is also 0, a value for the buffered response information is 0 after performing the and-or operation. If a value for the first response information is 1 and a value for the second response information is 0, a value for the buffered response information is 0 after performing the and-or operation. If a value for the first response information is 1 and a value for the second response information is also 1, a value for the buffered response information is 1 after performing the and-or operation. In this way, when a value for the buffered response information is 1, it means that the downlink data corresponding to the first downlink resource range and the second downlink resource range are received correctly. When a value for the buffered response information is 0, it means that the downlink data corresponding to the first downlink resource range and/or the second downlink resource range is received incorrectly. At this time, when the downlink data is subsequently retransmitted, the downlink data corresponding to the first downlink resource range and the second downlink resource range need to be retransmitted. That is, when a value for the buffered response information is 0, the downlink data in the third downlink resource range needs to be retransmitted.

It should be noted that the above buffered response information and other buffered response information will continue to be compressed if there is the other buffered response information. The processing method may refer to the above description on the and-or operation, which will not be repeated here.

In this way, the amount of buffered data may be reduced by compression, the occupation of the buffer memory space may be reduced, and the amount of data transmission may also be reduced when the response information is subsequently transmitted.

S203, within at least one second downlink resource range subsequently occupied by the downlink transmission, the terminal determines a preset feedback resource unit within each of the least one second downlink resource range as the target feedback resource unit.

Exemplarily, the last symbol in each second downlink resource range may be served as the preset feedback resource unit, which in turn is determined to be the target feedback resource unit. Subsequently, the terminal transmits the first response information on the last symbol within each second downlink resource range.

Figure 3:
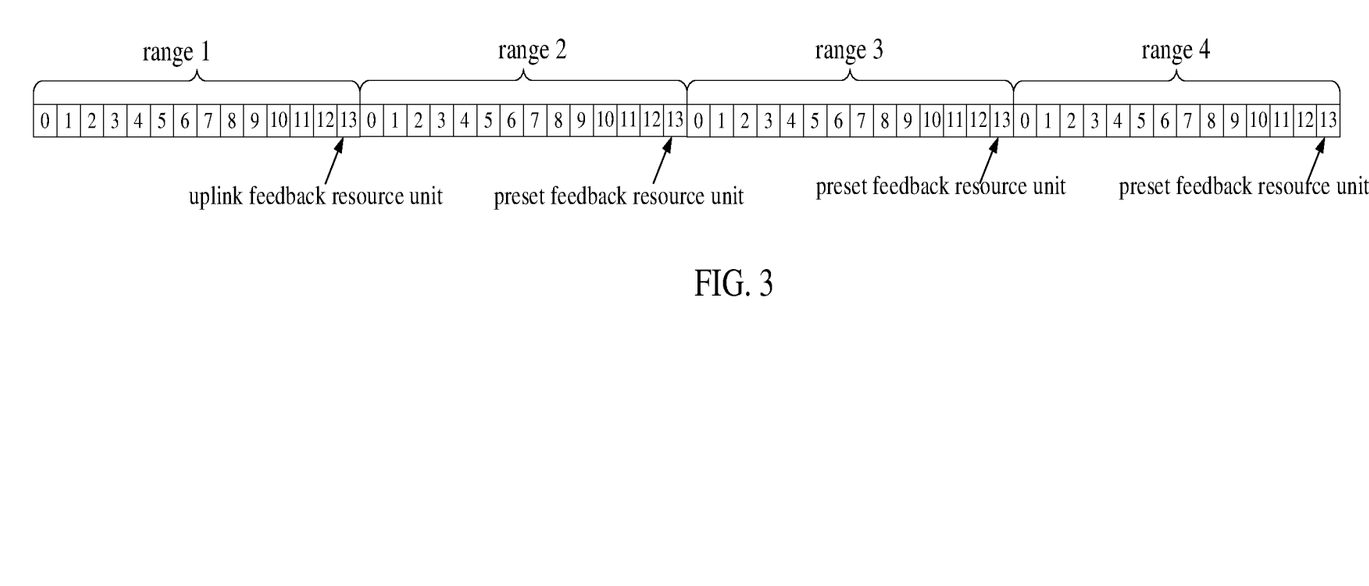
FIG. 3 is a schematic diagram of a downlink resource range according to embodiments of the disclosure.

As an example illustrated in FIG. 3, there are 4 consecutive downlink resource ranges and the resource unit is a symbol. The 4 downlink resource ranges are respectively denoted as range 1, range 2, range 3, and range 4, in which the range 1 corresponds to the first downlink resource range, and the range 2 to range 4 correspond to the second downlink resource ranges. Each downlink resource range includes 14 symbols, respectively symbol 0 to symbol 13. The symbol 13 in the range 1 is an uplink feedback resource unit. The symbol 13 in each of the range 2 to range 4 is a preset feedback resource unit. The terminal may determine that the preset feedback resource unit as the target feedback resource unit. In this way, the terminal may subsequently attempt to transmit the first response information sequentially on these target feedback resource units when the terminal fails to transmit the first response information on the symbol 13 in the range 1.

S204, the terminal retransmits the buffered response information to the base station on the target feedback resource unit.

Continuing with the example illustrated in FIG. 3, when the terminal fails to transmit the first response information on the symbol 13 in the range 1, the first response information may be retransmitted on the symbol 13 in the next downlink resource range (range 2). If the first response information still fails to be retransmitted, the first response information will continue to be transmitted on the symbol 13 of the next downlink resource range (range 3), and so on, until the transmitting is successful.

It should be noted that considering a case that the terminal fails continuously to transmit the buffered response information to the base station, more system resources will be occupied since the terminal tries to transmit the buffered response information for multiple times. Therefore, the subsequent actions of S205 and S206 may be employed to solve the problem.

S205, the terminal determines whether the buffered response information is successfully retransmitted to the base station.

If the buffered response information is successfully retransmitted to the base station, the action of S208 is executed.

If the buffered response information fails to be retransmitted to the base station, the action of S206 is executed.

S206, the terminal determines whether a preset discarding condition is satisfied.

The preset discarding condition may be reaching a second preset duration. That is, when the first response information fails to be retransmitted to the base station, the first response information is discarded if the first response information is still not successfully transmitted to the base station after the second preset duration is reached. The preset discarding condition may also be passing through a preset number of second downlink resource ranges (such as sub-frames or time slots, etc.). That is, when the first response information fails to be retransmitted to the base station, the first response information is discarded if the first response information is still not successfully transmitted to the base station after passing through the preset number of second downlink resource ranges (such as sub-frames or time slots, etc.).

If the preset discarding condition is satisfied, the action of S207 is executed.

If the preset discarding condition is not satisfied, it returns to the action of S202.

S207, the terminal discards the buffered response information.

S208, the base station determines whether the downlink data received by the terminal is correct based on the response information transmitted from the terminal.

If the received response information is the ACK information, the base station determines that the downlink data received by the terminal is correct, and if the received response information is the NACK information, the base station determines that the downlink data received by the terminal is incorrect.

In this action, if the base station determines that the downlink data received by the terminal is correct, it is determined the downlink transmission corresponding to the first downlink resource range is completed, and if it is determined that the downlink data received by the terminal is incorrect, the downlink data received by the terminal corresponding to the response message is retransmitted.

With the above method, the target resource unit for retransmitting the response information may be determined when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

It should be noted that for the above method embodiments, for the sake of simple description, they are all expressed as a series of action combinations, but those skilled in the art should know that the disclosure is not limited by the described sequence of actions, since certain actions in the disclosure may be performed in other orders or simultaneously. For example, the action of S202 and the action of S203 are not limited to performing the action of S202 first and then the action of S203. The action of S203 may also be performed first and the action of S202 is then performed, or the action of S202 and the action of S203 may be performed simultaneously. Secondly, those skilled in the art should also know that the embodiments described in the specification are all preferred embodiments, and the actions and modules involved are not necessarily required for the disclosure.

Figure 4:
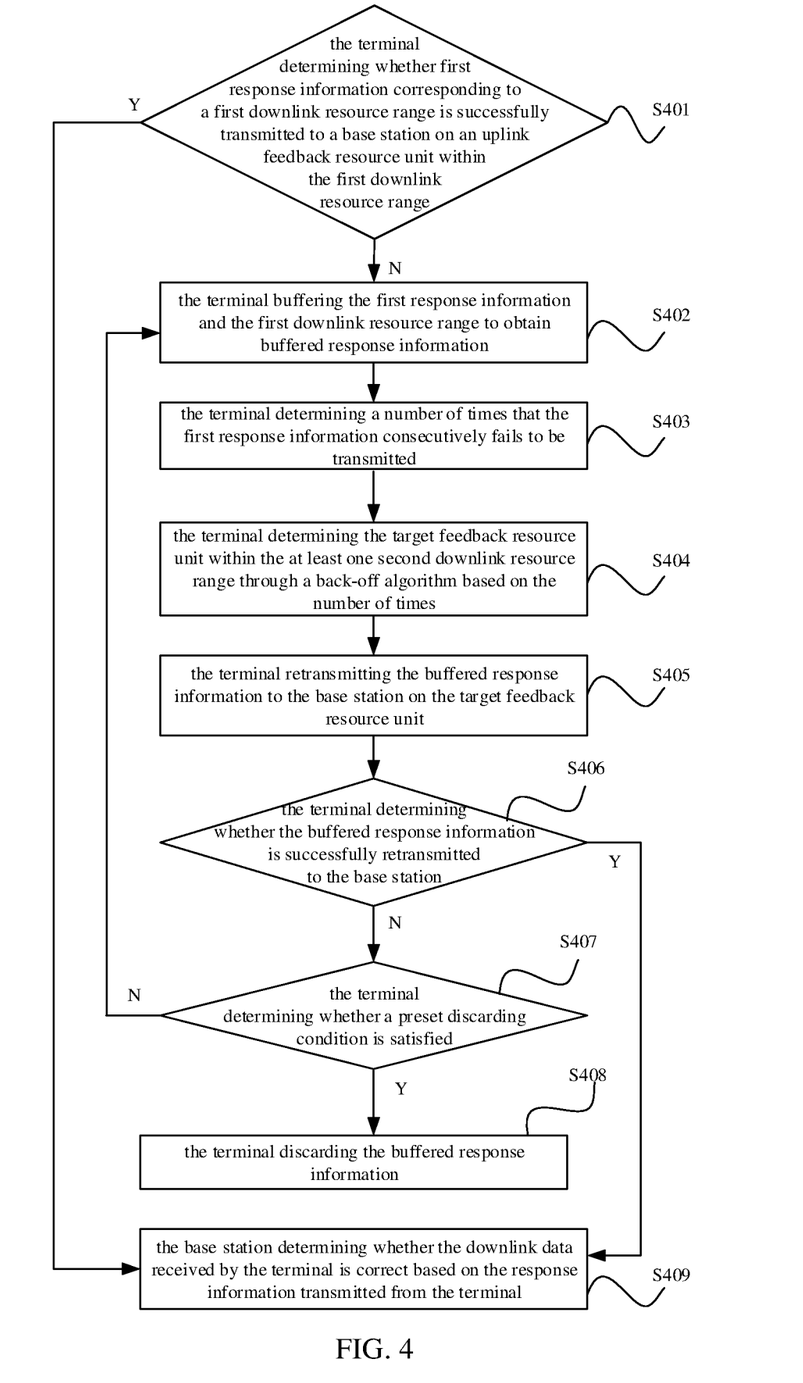
FIG. 4 is a flowchart of a third method for transmitting information according to embodiments of the disclosure.

FIG. 4 is a flowchart of a third method for transmitting information according to embodiments of the disclosure. As illustrated in FIG. 4, the method includes the following.

S401, the terminal determines whether first response information corresponding to a first downlink resource range is successfully transmitted to a base station on an uplink feedback resource unit within the first downlink resource range. The first downlink resource range is currently occupied by a downlink transmission.

The uplink feedback resource unit includes a resource unit for transmitting the first response information to the base station. The first response information may be ACK/NACK information. The ACK information means that downlink data is received correctly, and the NACK information means that the downlink data is received incorrectly. The base station needs to retransmit the downlink data within the downlink resource range corresponding to the NACK information when receiving the NACK information. The ACK/NACK information may be identified by an identification bit. For example, the ACK information may be represented by 1 and the NACK information may be represented by 0.

Generally, the last resource unit in the first downlink resource range may be served as the uplink feedback resource unit. In this action, whether the first response information corresponding to the first downlink resource range is successfully transmitted to the base station may be determined by the two aspects, i.e., determining whether the terminal transmits the first response information when the first response information should be transmitted, and determining whether the terminal receives a response confirmation message transmitted from the base station when transmitting the first response information. That is, it may be determined whether the first response information is transmitted to the base station on the uplink feedback resource unit; if it is determined that the first response information is not transmitted to the base station, it is determined that the first response information fails to be transmitted. That is, when the first response information corresponding to the first downlink resource range should be transmitted while the terminal does not transmit the first response information, it is determined that the first response information fails to be transmitted. It is determined whether a response confirmation message transmitted from the base station is received within a first preset duration after transmitting the first response information to the base station; it is determined that the first response information is transmitted successfully if the first preset duration is reached and the response confirmation message transmitted from the base station is received; it is determined that the first response information fails to be transmitted if the first preset duration is reached and the response confirmation message transmitted from the base station is not received.

If it is determined that the first response information is successfully transmitted, the action of S409 is executed.

If it is determined that the first response information fails to be transmitted, the action of S402 to the action of S405 are executed.

S402, the terminal buffers the first response information and the first downlink resource range to obtain buffered response information.

For the description on this action, reference may be made to the description on the action of S202 in the above embodiments, which will not be repeated here.

S403, the terminal determines a number of times that the first response information consecutively fails to be transmitted.

S404, the terminal determines the target feedback resource unit within the at least one second downlink resource range through a back-off algorithm based on the number of times.

In a possible implementation, a number of back-off resources may be determined through the back-off formula based on the number of times. The uplink feedback resource unit is backed off based on the number of back-off resources to obtain a target unit location, and a resource unit at the target unit location may be determined as the target feedback resource unit.

The back-off formula includes $M=N*2^{n-1}$ or $M=N*2n$, in which M is the number of back-off resources, N is a number of resource units included in the second downlink resource range, and n is the number of times.

Figure 5:
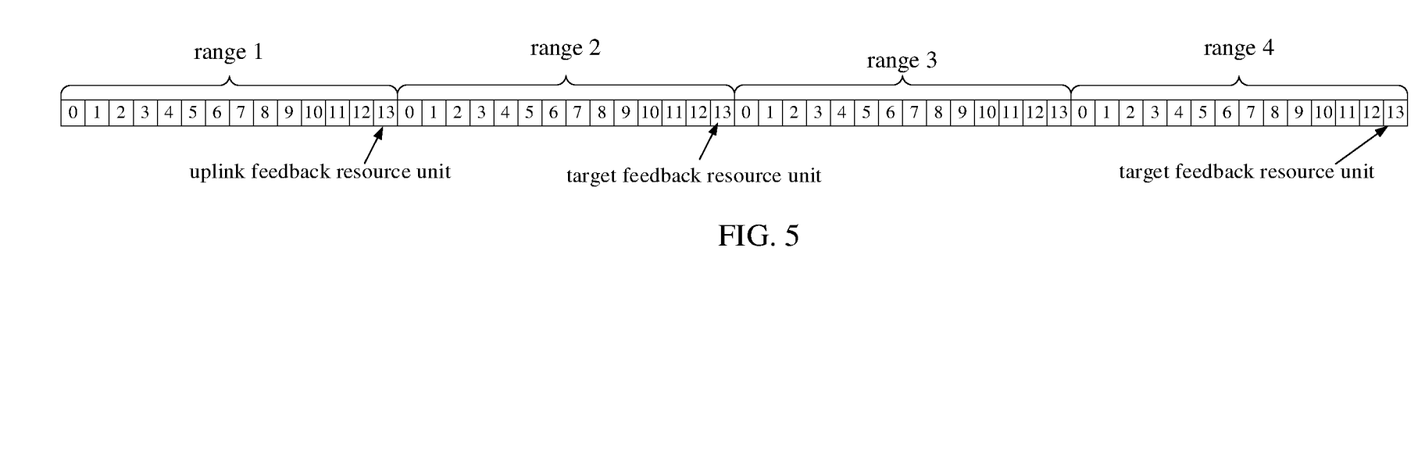
FIG. 5 is a schematic diagram of another downlink resource range according to embodiments of the disclosure.

As an example illustrated in FIG. 5, there are 4 consecutive downlink resource ranges, and the resource unit is a symbol. The resource ranges are marked as range 1, range 2, range 3, and range 4, in which the range 1 corresponds to the first downlink resource range, and the range 2 to range 4 correspond to the second downlink resource ranges. Each downlink resource range includes 14 symbols, respectively symbol 0 to symbol 13. The symbol 13 (the shaded area) in the range 1 is the uplink feedback resource unit. If the first response information fails to be transmitted to the base station on the symbol 13 in the range 1 for a first time, it may be obtained by the formula $M=N*2^{n-1}$ that the number of back-off resources is 14, the symbol 13 in the range 2 is obtained after the symbol 13 in the range 1 is backed off by 14 resource units and determined the same as the target feedback resource unit. If the first response information fails to be transmitted to the base station on the symbol 13 of the range 2 for a second time, it may be obtained by the formula $M=N*2n-1$ that the number of back-off resources is 28, the symbol 13 in the range 4 is obtained after the symbol 13 is backed off by 28 resource units and determined the same as the target feedback resource unit.

Of course, it is explained above as an example that the formula $M=N*2^{n-1}$ taken for calculating the number of back-off resources. The formula for calculating the number of back-off resources in the disclosure is not limited herein. For example, the disclosure may also take the formula $M=N*2n$ for calculating the number of back-off resources.

S405, the terminal retransmits the buffered response information to the base station on the target feedback resource unit.

Continuing with the example illustrated in FIG. 5, when the terminal fails to transmit the first response information on the symbol 13 in the range 1 for the first time, the symbol 13 in the range 2 is determined as the target feedback resource unit by the above formula $M=N*2^{n-1}$, and the first response information is retransmitted on the symbol 13 in the range 2. If the first response information still fails to be retransmitted on the symbol 13 in the range 2 (that is, the second failure), the symbol 13 in the range 4 is determined by the above formula $M=N*2^{n-1}$ as the target feedback resource unit, and the first response information is continued to transmit on the symbol 13 in the range 4, and so on, until the transmitting is successful.

S406, the terminal determines whether the buffered response information is successfully retransmitted to the base station.

If the buffered response information is successfully retransmitted to the base station, the action of S409 is executed.

If the buffered response information fails to be retransmitted to the base station, the action of S407 is executed.

It should be noted that considering a case that the terminal fails continuously to transmit the buffered response information to the base station, more system resources will be occupied since the terminal tries to transmit the buffered response information for multiple times. Therefore, the subsequent action of S407 and S408 solves the problem.

S407, the terminal determines whether a preset discarding condition is satisfied.

The preset discarding condition may be reaching a second preset duration. That is, when the first response information fails to be retransmitted to the base station, the first response information is discarded if the first response information is still not successfully transmitted to the base station after the second preset duration is reached. The preset discarding condition may also be passing through a preset number of second downlink resource ranges (such as sub-frames or time slots, etc.). That is, when the first response information fails to be retransmitted to the base station, the first response information is discarded if the first response information is still not successfully transmitted to the base station after passing through the preset number of second downlink resource ranges (such as sub-frames or time slots, etc.).

If the preset discarding condition is satisfied, the action of S409 is executed;

If the preset discarding condition is not satisfied, it returns to the action of S402.

S408, the terminal discards the buffered response information.

S409, the base station determines whether the downlink data received by the terminal is correct based on the response information transmitted from the terminal.

If the received response information is the ACK information, the base station determines that the downlink data received by the terminal is correct, and if the received response information is the NACK information, the base station determines that the downlink data received by the terminal is incorrect.

In this action, if the base station determines that the downlink data received by the terminal is correct, it is determined the downlink transmission corresponding to the first downlink resource range is completed, and if it is determined that the downlink data received by the terminal is incorrect, the downlink data received by the terminal corresponding to the response message is retransmitted.

With the above method, the target resource unit for retransmitting the response information may be determined when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

It should be noted that for the above method embodiments, for the sake of simple description, they are all expressed as a series of action combinations, but those skilled in the art should know that the disclosure is not limited by the described sequence of actions, since certain actions in the disclosure may be performed in other orders or simultaneously. For example, the above actions of S402 and S403-S404 are not limited to performing the action of S402 first and then the actions of S403-S404. The actions of S403-S404 may also be performed first and the action of S402 is then performed, or the action of S402 and the actions of S403-S404 may be performed simultaneously. Secondly, those skilled in the art should also know that the embodiments described in the specification are all preferred embodiments, and the actions and modules involved are not necessarily required for the disclosure.

Figure 6:
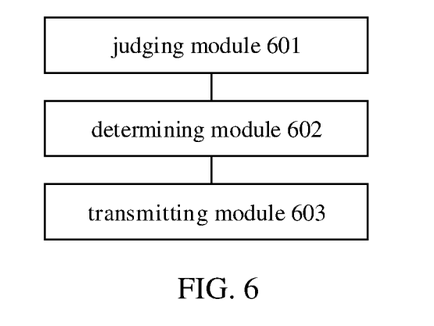
FIG. 6 is a block diagram of an apparatus for transmitting information according to embodiments of the disclosure.

FIG. 6 is a block diagram of an apparatus for transmitting information according to embodiments of the disclosure. As illustrated in FIG. 6, the apparatus is applicable to a terminal and includes a judging module 601, a determining module 602, and a transmitting module 603.

The determining module 601 is configured to determine whether first response information corresponding to a first downlink resource range is successfully transmitted to a base station on an uplink feedback resource unit within the first downlink resource range, the first downlink resource range being currently occupied by a downlink transmission; the uplink feedback resource unit including a resource unit for transmitting the first response information to the base station.

The determining module 602 is configured to determine a target feedback resource unit within at least one second downlink resource range subsequently occupied by the downlink transmission when the first response information fails to be transmitted.

The transmitting module 603 is configured to transmit the first response information to the base station on the target feedback resource unit.

Optionally, the determining module 602 is configured to determine a preset feedback resource unit within each of the at least one second downlink resource range as the target feedback resource unit.

Optionally, the determining module 602 is configured to determine a number of times that the first response information consecutively fails to be transmitted, and determine the target feedback resource unit within the at least one second downlink resource range through a back-off algorithm based on the number of times.

Optionally, the determining module 602 is configured to determine a number of back-off resources through the back-off algorithm based on the number of times, and determine a target unit location based on the number of back-off resources, and determine a resource unit at the target unit location as the target feedback resource unit. The back-off formula includes $M=N*2^{n-1}$ or $M=N*2n$, in which M is the number of back-off resources, N is a number of resource units included in the second downlink resource range, and n is the number of times.

Optionally, the determining module 601 is configured to determine whether the first response information is transmitted to the base station on the uplink feedback resource unit; determine that the first response information fails to be transmitted when it is determined that the first response information is not transmitted to the base station; determine whether a response confirmation message is received from the base station within a first preset duration after transmitting the first response information to the base station; determine that the first response information fails to be transmitted if the response confirmation message is not received from the base station when the first preset duration is reached; and determine that the first response information is transmitted successfully if the response confirmation message is received from the base station when the first preset duration is reached.

Optionally, the response confirmation message includes a confirmation message broadcast by the base station through a broadcast signaling; or the response confirmation message includes a confirmation message transmitted by the base station through a radio resource control RRC mescsage; or the response confirmation message includes a confirmation message transmitted by the base station through a media access control MAC control element CE signaling; or the response confirmation message includes a confirmation message transmitted by the base station through a physical layer signaling.

Figure 7:
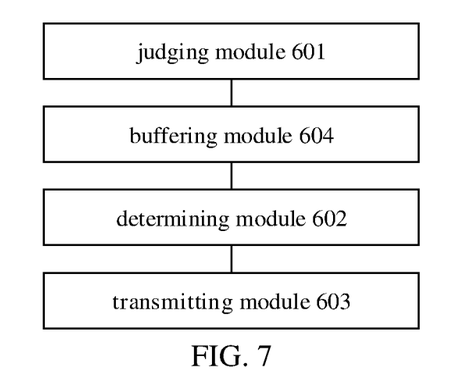
FIG. 7 is a block diagram of an apparatus for transmitting information according to embodiments of the disclosure.

Optionally, as illustrated in FIG. 7, the apparatus further includes a buffering module 604.

The buffering module 604 is configured to buffer the first response information and the first downlink resource range to obtain buffered response information.

The transmitting module 603 is configured to transmit the buffered response information to the base station on the target feedback resource unit.

Optionally, when there are second response information and a corresponding second downlink resource range that have been buffered, the buffering module 604 is configured to buffer the first response information and the first downlink resource range, and compress the first response information and the second response information to obtain the buffered response information.

Or the buffering module 604 is configured to compress the first response information and the second response information to obtain the buffered response information, and buffer the buffered response information.

A third downlink resource range corresponding to the buffered response information includes the first downlink resource range and the second downlink resource range.

Optionally, the buffering module 604 is configured to perform an and-or operation on the first response information and the second response information to obtain the buffered response information.

Optionally, the apparatus further includes: a discarding module configured to determine whether a preset discarding condition is satisfied when the first response information fails to be transmitted to the base station on the target feedback resource unit, and discard the first response information when the preset discarding condition is satisfied.

Optionally, the preset discarding condition includes: reaching a second preset duration; or passing through a preset number of second downlink resource ranges.

With the above apparatus, the target resource unit for retransmitting the response information may be determined when the response information fails to be transmitted on the uplink feedback resource unit in the downlink resource range, so that the response information is retransmitted on the target resource unit. In this way, the disclosure may try to perform uplink feedback of the response information for multiple times when the response information fails to be retransmitted because of the blocked uplink transmission.

It should be noted that, for the specific description on each module of the above apparatus, reference may be made to the above related description on transmitting information, which is not repeated here.

Figure 8:
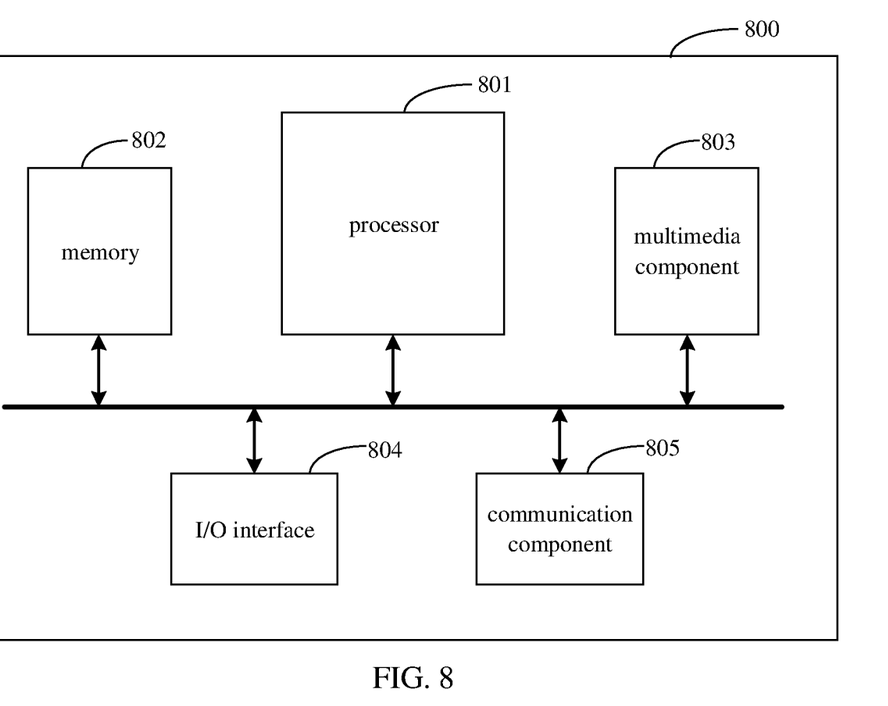
FIG. 8 is a block diagram of a terminal according to embodiments of the disclosure.

FIG. 8 is a block diagram of a terminal according to embodiments of the disclosure. As illustrated in FIG. 8, the terminal 800 may include: a processor 801, a memory 802, a multimedia component 803, an input/output (I/O) interface 804, and a communication component 805.

The processor 801 is configured to control the overall operation of the device 800 to complete all or part of the actions of the method for transmitting information. The memory 802 is configured to store various types of data to support operations on the terminal 800. For example, these data may include instructions for any application or method to operate on the terminal 800, and application-related data, such as contact data, messages transmitted and received, pictures, audios, videos.

The memory 802 may be implemented by any type of volatile or non-volatile storage terminal device or a combination thereof, for example, a static random access memory (SRAM), an electrically erasable programmable read-only memory (EEPROM), an erasable programmable read-only memory (EPROM), a programmable read-only memory (PROM), an only read-only memory (ROM), a magnetic memory, a flash memory, a magnetic disk or an optical disk. The multimedia component 803 may include a screen and an audio component. The screen may be a touch screen, for example, and the audio component is configured to output and/or input audio signals. For example, the audio component may include a microphone, which is configured to receive external audio signals. The received audio signal may be further stored in the memory 802 or transmitted through the communication component 805. The audio component also includes at least one speaker for outputting audio signals. The I/O interface 804 provides an interface between the processor 801 and other interface modules. The other interface modules above may be keyboards, mice, buttons, etc. These buttons may be virtual buttons or physical buttons. The communication component 805 is configured for wired or wireless communication between the terminal 800 and other terminal devices. Wireless communication is such as Wi-Fi, Bluetooth, Near Field Communication (NFC), 2G, 3G, or 4G or a combination of one or more of them, so the corresponding communication component 805 may include: a Wi-Fi module, a Bluetooth module and a NFC module.

In an example embodiment, the terminal 800 may be implemented by one or more application specific integrated circuits (ASIC), digital signal processors (DSP), and digital signal processing devices (DSPD), programmable logic devices (PLD), field programmable gate arrays (FPGA), controllers, microcontrollers, microprocessors or other electronic components, and configured to execute the above method for transmitting information.

In another example embodiment, there is also provided a computer-readable storage medium including program instructions that when executed by a processor, implement the actions of the above method for transmitting information. For example, the computer-readable storage medium may be the memory 802 including program instructions, and the program instructions may be executed by the processor 801 of the terminal 800 to complete the above method for transmitting information.

The preferred embodiments of the disclosure are described in detail above in combination with the accompanying drawings. However, the disclosure is not limited to the specific details in the above embodiments. Within the scope of the technical concept of the disclosure, various simple modifications may be made to the technical solutions of the disclosure. These simple modifications all belong to the protection scope of the disclosure.

In addition, it should be noted that the various specific technical features described in the above specific embodiments may be combined in any suitable manner without contradiction. In order to avoid unnecessary repetition, various possible combination will not be explained separately in the disclosure.

In addition, various different embodiments of the disclosure may also be combined arbitrarily, as long as they do not violate the concept of the disclosure, they should also be regarded as the content disclosed in the disclosure.

The invention claimed is:

1. A method for transmitting information, applicable to a terminal and comprising:
    determining whether first response information corresponding to a first downlink resource range is successfully transmitted to a base station on an uplink feedback resource unit within the first downlink resource range, the first downlink resource range being currently occupied by a downlink transmission, the uplink feedback resource unit comprising a resource unit for transmitting the first response information to the base station;
    determining a target feedback resource unit within at least one second downlink resource range subsequently occupied by the downlink transmission in response to a determination that the first response information fails to be transmitted; and
    transmitting the first response information to the base station on the target feedback resource unit;
    wherein determining the target feedback resource unit within the at least one second downlink resource range subsequently occupied by the downlink transmission comprises:
    determining a number of fail times that the first response information consecutively fails to be transmitted; and
    determining the target feedback resource unit within the at least one second downlink resource range through a back-off algorithm based on the number of fail times;
    wherein determining the target feedback resource unit within the at least one second downlink resource range through the back-off algorithm based on the number of fail times comprises:
    determining a number of back-off resources through the back-off algorithm based on the number of fail times; and
    determining a target unit location based on the number of back-off resources, and determining a resource unit at the target unit location as the target feedback resource unit;
    wherein the back-off formula comprises:

$M=N*2^{n-1}$; or $M=N*2n$, where M is an integer value representing the number of back-off resources, N is an integer value representing a number of resource units included in the second downlink resource range, and n is an integer value representing the number of fail times.

2. The method of claim 1, wherein determining the target feedback resource unit within the at least one second downlink resource range subsequently occupied by the downlink transmission comprises: determining a preset feedback resource unit within each of the at least one second downlink resource range as the target feedback resource unit.

3. The method of claim 1, wherein determining whether the first response information corresponding to the first downlink resource range is successfully transmitted to the base station comprises: determining whether the first response information is transmitted to the base station on the uplink feedback resource unit; determining that the first response information fails to be transmitted in response to a determination that the first response information is not transmitted to the base station; determining whether a response confirmation message is received from the base station within a first preset duration after transmitting the first response information to the base station; determining that the first response information fails to be transmitted in response to a determination that the response confirmation message is not received from the base station when the first preset duration is reached; and determining that the first response information is transmitted successfully in response to a determination that the response confirmation message is received from the base station when the first preset duration is reached.

4. The method of claim 3, wherein the response confirmation message comprises one of: a confirmation message broadcast by the base station through a broadcast signaling; a confirmation message transmitted by the base station through a radio resource control (RRC) message; a confirmation message transmitted by the base station through a media access control (MAC) control element (CE) signaling; or a confirmation message transmitted by the base station through a physical layer signaling.

5. The method of claim 1, wherein before transmitting the first response information to the base station on the target feedback resource unit, the method further comprises: buffering the first response information and the first downlink resource range to obtain buffered response information; wherein transmitting the first response information to the base station on the target feedback resource unit comprises: transmitting the buffered response information to the base station on the target feedback resource unit.

6. The method of claim 5, wherein when there are second response information and a corresponding second downlink resource range that have been buffered, buffering the first response information and the first downlink resource range to obtain the buffered response information comprises one of: buffering the first response information and the first downlink resource range, and compressing the first response information and the second response information to obtain the buffered response information, or, compressing the first response information and the second response information to obtain the buffered response information, and buffering the buffered response information; wherein a third downlink resource range corresponding to the buffered response information comprises the first downlink resource range and the second downlink resource range.

7. The method of claim 6, wherein compressing the first response information and the second response information to obtain the buffered response information comprises: performing an and-or operation on the first response information and the second response information to obtain the buffered response information.

8. The method of claim 1, further comprising: determining whether a preset discarding condition is satisfied in response to that the first response information fails to be transmitted to the base station on the target feedback resource unit; and discarding the first response information in response to a determination that the preset discarding condition is satisfied.

9. The method of claim 8, wherein the preset discarding condition comprises one of: reaching a second preset duration; or passing through a preset number of second downlink resource ranges.

10. A non-transitory computer-readable storage medium having stored thereon instructions that, when executed by a processor of a terminal, cause the terminal to perform a method for transmitting information, the method comprising:
    determining whether first response information corresponding to a first downlink resource range is successfully transmitted to a base station on an uplink feedback resource unit within the first downlink resource range, the first downlink resource range being currently occupied by a downlink transmission, the uplink feedback resource unit comprising a resource unit for transmitting the first response information to the base station;

determining a target feedback resource unit within at least one second downlink resource range subsequently occupied by the downlink transmission in response to a determination that the first response information fails to be transmitted; and transmitting the first response information to the base station on the target feedback resource unit;

wherein determining the target feedback resource unit within the at least one second downlink resource range subsequently occupied by the downlink transmission comprises:

determining a number of fail times that the first response information consecutively fails to be transmitted; and determining the target feedback resource unit within the at least one second downlink resource range through a back-off algorithm based on the number of fail times;

wherein determining the target feedback resource unit within the at least one second downlink resource range through the back-off algorithm based on the number of fail times comprises:

determining a number of back-off resources through the back-off algorithm based on the number of fail times; and determining a target unit location based on the number of back-off resources, and determining a resource unit at the target unit location as the target feedback resource unit;

wherein the back-off formula comprises:

$$M=N*2^{n-1}; \text{ or}$$

$$M=N*2n,$$

where M is an integer value representing the number of back-off resources, N is an integer value representing a number of resource units included in the second downlink resource range, and n is an integer value representing the number of fail times.

11. A terminal, comprising:
a processor; and
a memory storing instructions executable by the processor;
wherein the processor is configured to:
determine whether first response information corresponding to a first downlink resource range is successfully transmitted to a base station on an uplink feedback resource unit within the first downlink resource range, the first downlink resource range being currently occupied by a downlink transmission, the uplink feedback resource unit comprising a resource unit for transmitting the first response information to the base station;

determine a target feedback resource unit within at least one second downlink resource range subsequently occupied by the downlink transmission in response to a determination that the first response information fails to be transmitted; and transmit the first response information to the base station on the target feedback resource unit;

wherein in determining the target feedback resource unit within the at least one second downlink resource range subsequently occupied by the downlink transmission, the processor is further configured to:

determine a number of fail times that the first response information consecutively fails to be transmitted; and determine the target feedback resource unit within the at least one second downlink resource range through a back-off algorithm based on the number of fail times;

wherein in determining the target feedback resource unit within the at least one second downlink resource range through the back-off algorithm based on the number of fail times, the processor is further configured to:

determine a number of back-off resources through the back-off algorithm based on the number of fail times; and determine a target unit location based on the number of back-off resources, and determine a resource unit at the target unit location as the target feedback resource unit;

wherein the back-off formula comprises:

$$M=N*2^{n-1}; \text{ or}$$

$$M=N*2n,$$

where M is an integer value representing the number of back-off resources, N is an integer value representing a number of resource units included in the second downlink resource range, and n is an integer value representing the number of fail times.

12. The terminal of claim 11, wherein in determining the target feedback resource unit within the at least one second downlink resource range subsequently occupied by the downlink transmission, the processor is further configured to: determine a preset feedback resource unit within each of the at least one second downlink resource range as the target feedback resource unit.

13. The terminal of claim 11, wherein before transmitting the first response information to the base station on the target feedback resource unit, the processor is further configured to: buffer the first response information and the first downlink resource range to obtain buffered response information; wherein transmitting the first response information to the base station on the target feedback resource unit comprises: transmitting the buffered response information to the base station on the target feedback resource unit.

14. The terminal of claim 13, wherein when there are second response information and a corresponding second downlink resource range that have been buffered, buffering the first response information and the first downlink resource range to obtain the buffered response information comprises one of: buffering the first response information and the first downlink resource range, and compressing the first response information and the second response information to obtain the buffered response information, or, compressing the first response information and the second response information to obtain the buffered response information, and buffering the buffered response information; wherein a third downlink resource range corresponding to the buffered response information comprises the first downlink resource range and the second downlink resource range.

15. The terminal of claim 14, wherein in compressing the first response information and the second response information to obtain the buffered response information, the processor is further configured to: perform an and-or operation on the first response information and the second response information to obtain the buffered response information.

16. The terminal of claim 11, wherein the processor is further configured to: determine whether a preset discarding condition is satisfied in response to that the first response information fails to be transmitted to the base station on the target feedback resource unit; and discard the first response information in response to a determination that the preset discarding condition is satisfied.

\* \* \* \* \*